(12) United States Patent
Cho et al.

(10) Patent No.: US 12,014,310 B2
(45) Date of Patent: Jun. 18, 2024

(54) ARTIFICIAL INTELLIGENCE BASED HOTEL DEMAND MODEL

(71) Applicant: Oracle International Corporation, Redwood Shores, CA (US)

(72) Inventors: Sanghoon Cho, Northport, AL (US); Andrew Vakhutinsky, Sharon, MA (US); Alan Wood, San Diego, CA (US); Jorge Luis Rivero Perez, Naples, FL (US); Jean-Philippe Dumont, Columbia, MD (US); John Thomas Coulthurst, Steamboat Springs, CO (US); Denysse Diaz, Sachse, TX (US)

(73) Assignee: Oracle International Corporation, Redwood Shores, CA (US)

(*) Notice: Subject to any disclaimer, the term of this patent is extended or adjusted under 35 U.S.C. 154(b) by 353 days.

(21) Appl. No.: 17/399,342

(22) Filed: Aug. 11, 2021

(65) Prior Publication Data
US 2022/0414557 A1    Dec. 29, 2022

Related U.S. Application Data

(60) Provisional application No. 63/215,688, filed on Jun. 28, 2021.

(51) Int. Cl.
*G06Q 10/067* (2023.01)
*G06F 18/2321* (2023.01)
(Continued)

(52) U.S. Cl.
CPC ....... *G06Q 10/067* (2013.01); *G06F 18/2321* (2023.01); *G06F 18/2415* (2023.01);
(Continued)

(58) Field of Classification Search
CPC .. G06Q 10/067; G06Q 10/02; G06Q 30/0202; G06F 18/2321; G06F 18/2415;
(Continued)

(56) References Cited

U.S. PATENT DOCUMENTS

2002/0049535 A1    4/2002   Rigo et al.
2002/0065699 A1    5/2002   Talluri
(Continued)

OTHER PUBLICATIONS

Elaheh Fata et al: "Multi-stage and Multi-customer Assortment Optimization with Inventory Constraints", arxiv.org, Cornell University Library, 201 Olin Library Cornell University Ithaca, NY 14853, Jul. 26, 2020, XP081703603, pp. 1-62.
(Continued)

*Primary Examiner* — Jonathan P Ouellette
(74) *Attorney, Agent, or Firm* — Potomac Law Group, PLLC

(57) ABSTRACT

Embodiments generate a demand model for a potential hotel customer of a hotel room. Embodiments, based on features of the potential hotel customer, form a plurality of clusters, each cluster including a corresponding weight and cluster probabilities. Embodiments generate an initial estimated mixture of multinomial logit ("MNL") models corresponding to each of the plurality of clusters, the mixture of MNL models including a weighted likelihood function based on the features and the weights. Embodiments determine revised cluster probabilities and update the weights. Embodiments estimate an updated estimated mixture of MNL models and maximize the weighted likelihood function based on the revised cluster probabilities and updated weights. Based on the update weights and updated estimated mixture of MNL models, embodiments generate the demand model that is adapted to predict a choice probability of room categories and rate code combinations for the potential hotel customer.

20 Claims, 18 Drawing Sheets

(51) Int. Cl.
*G06F 18/2415* (2023.01)
*G06N 20/00* (2019.01)
*G06Q 10/02* (2012.01)
*G06Q 10/06* (2023.01)
*G06Q 10/0631* (2023.01)
*G06Q 10/0637* (2023.01)
*G06Q 10/10* (2023.01)
*G06Q 30/0202* (2023.01)

(52) U.S. Cl.
CPC ............. *G06N 20/00* (2019.01); *G06Q 10/02* (2013.01); *G06Q 30/0202* (2013.01)

(58) Field of Classification Search
CPC ............ G06N 20/00; G06N 5/01; G06N 7/01; G06N 20/20
USPC .................................................. 705/1.1, 348
See application file for complete search history.

(56) References Cited

U.S. PATENT DOCUMENTS

| | | | |
|---|---|---|---|
| 2003/0177103 A1* | 9/2003 | Ivanov | G06Q 30/0283 705/400 |
| 2005/0033706 A1 | 2/2005 | Krikler et al. | |
| 2006/0149713 A1 | 7/2006 | Walker | |
| 2006/0200370 A1 | 9/2006 | Ratliff et al. | |
| 2007/0027745 A1 | 2/2007 | Ouimet | |
| 2007/0075136 A1 | 4/2007 | Jacob | |
| 2007/0130201 A1 | 6/2007 | Ratliff et al. | |
| 2007/0241944 A1 | 10/2007 | Coldren et al. | |
| 2012/0130726 A1 | 5/2012 | Subramanian | |
| 2013/0041902 A1 | 2/2013 | Swann et al. | |
| 2014/0095524 A1 | 4/2014 | Fleischman et al. | |
| 2014/0222518 A1 | 8/2014 | Adkins | |
| 2014/0236708 A1 | 8/2014 | Wolff et al. | |
| 2014/0310072 A1* | 10/2014 | Wojciechowski | G06N 20/00 705/7.38 |
| 2016/0042302 A1 | 2/2016 | Watanabe et al. | |
| 2016/0078374 A1 | 3/2016 | Lippow et al. | |
| 2016/0225108 A1 | 8/2016 | Fishberg et al. | |
| 2016/0267402 A1 | 9/2016 | Szabo | |
| 2017/0004590 A1 | 1/2017 | Gluhovsky et al. | |
| 2017/0076350 A1 | 3/2017 | Fleischman et al. | |
| 2017/0116624 A1 | 4/2017 | Moore et al. | |
| 2018/0349471 A1 | 12/2018 | Toudji et al. | |
| 2019/0035009 A1 | 1/2019 | Williams et al. | |
| 2019/0244230 A1 | 8/2019 | Subramanian et al. | |
| 2019/0325463 A1 | 10/2019 | Li et al. | |
| 2020/0012956 A1 | 1/2020 | Ikeda et al. | |
| 2020/0043072 A1 | 2/2020 | Li et al. | |
| 2021/0117998 A1* | 4/2021 | Cho | G06N 20/20 |
| 2021/0136537 A1 | 5/2021 | Zaltzman et al. | |
| 2021/0279647 A1 | 9/2021 | Sivanandam et al. | |
| 2022/0335072 A1 | 10/2022 | Blaya et al. | |
| 2023/0036167 A1 | 2/2023 | Yusuf et al. | |

OTHER PUBLICATIONS

Cho et al., Optimal Dynamic Hotel Pricing, May 21, 2018.
Friedman et al., "Regularization Paths for Generalized Linear Models via Coordinate Descent", Journal of Statistical Software, Jan. 2010, vol. 33, issue 1.
Li, Y., Wang, B. and Caudillo-Fuentes, L.A. (2013) Modeling a hotel room assignment problem. Journal of Revenue and Pricing Management 12: 120-127.
Brownlee, "How to Avoid Overfitting in Deep Learning Neural Networks," Machine Learning Mastery, 16 pages, (Year: 2019).
Desai, "Expedia Recommender System," The Wayback Machine, 8 pages, (2018).
Unknown, IBM SPSS Regression 22, Version 22, 43 pages, (Year: 2016).
Unknown, "UCLA Statistical Methods and Data Analytics", "Logistic Regression: Stata Data Analysis Examples",7 pages, (2022).

* cited by examiner

| Rate Code | Breakfast Included Rate | | |
|---|---|---|---|
| Room | Deluxe | Superior | Suite |
| Price | $335 | $320 | $408 |

| Rate Code | Best Available Rate (BAR) | | |
|---|---|---|---|
| Room | Deluxe | Superior | Suite |
| Price | $325 | $310 | $390 |

| Rate Code | Package Rate | | |
|---|---|---|---|
| Room | Deluxe | Superior | Suite |
| Price | $315 | $300 | $380 |

Fig. 5

Expectation Maximization (EM) algorithm

Proposed Likelihood function:

$$L(\vec{\beta}) = \prod_{i=1}^{n} \underbrace{\sum_{g=1}^{G} P(\ell_i = g | \vec{x}_i)}_{\text{Cluster Model}} \prod_{j \in S_i} \underbrace{\left( \frac{\exp(\vec{\beta}_g \vec{z}_{ij})}{\sum_{j' \in S_i} \exp(\vec{\beta}_g \vec{z}_{ij'})} \right)^{I(y_i = j)}}_{\text{Choice Model}}$$

- Cluster model : initially determined by a soft-clustering method.
- The model parameters $\vec{\beta}_g$ ($g = 1, \ldots, G$) estimated by maximizing the likelihood function above

Fig. 8

Expectation Maximization (EM) algorithm

302 Initial Step:
- Perform learning an (unsupervised) soft clustering (e.g., random forest, k-means) with $G$ clusters based on the customer-level covariates ($\vec{x}_i$) and obtain the cluster probabilities for each customer, $p_{i1}^{(0)}, \ldots, p_{iG}^{(0)}$ such that $\sum_{g=1}^{G} p_{ig}^{(0)} = P(\ell_i = g | \vec{x}_i)$ at the $t$-th iteration.

306 Expectation (E)-Step:
- Calculate the conditional cluster probabilities by using the observed choice and the fitted discrete choice model as follows:

$$\pi_{ig}^{(t)} = P(\ell_i = g | y_i, \vec{x}_i, \vec{z}_i) \propto p_{ig}^{(0)} \times \prod_{j \in S_i} \left( \frac{\exp(\vec{\beta}_g^{(t)} \vec{z}_{i,j})}{\sum_{j' \in S_i} \exp(\vec{\beta}_g^{(t)} \vec{z}_{i,j'})} \right)^{I(y_i = j)}$$

such that $\sum_{g=1}^{G} \pi_{ig}^{(t)} = 1$.

Fig. 9

Expectation Maximization (EM) algorithm

308 Maximization (M)-Step:
- Update the choice model parameters to $\vec{\beta}_g^{(t+1)}$ by solving the following equation with respect to $\vec{\beta}_g$ for $g = 1, \ldots, G$:

$$\frac{\partial \ell(\vec{\beta})}{\partial \vec{\beta}_g} = \sum_{i=1}^{n} \pi_{ig}^{(t)} \sum_{j \in S_i} \left[ I(y_i = j) - \frac{\exp\left(\vec{\beta}_g^{(t)} \vec{z}_{ij}\right)}{\sum_{j' \in S_i} \exp\left(\vec{\beta}_g^{(t)} \vec{z}_{ij'}\right)} \right] \vec{z}_{ij} \stackrel{set}{=} \vec{0}.$$

310 Repeat
- Repeat [E-step] and [M-step] until the convergence criterion:

$$|New\ Prediction\ Error - Old\ Prediction\ Error| < 0.0001, \text{ is met.}$$

Fig. 10

Prediction

- Retrain the model as a supervised classifier based on the current (soft) cluster assignment of the observed customers to predict the initial cluster probability of a new customer $\rightarrow p_{new,1}^{(0)}, \ldots, p_{new,G}^{(0)}$

- Compute the choice probability for a new customer by using the final estimates of $\vec{\beta}_1, \ldots, \vec{\beta}_G$ and $p_{new,1}^{(0)}, \ldots, p_{new,G}^{(0)}$:

$$P(y_{new} = j \mid \vec{x}_{new}, \vec{z}_{new}) = \sum_{g=1}^{G} p_{new,g}^{(0)} \times \prod_{j \in S_{new}} \left\{ \left( \frac{\exp(\hat{\vec{\beta}}_g \vec{z}_{new,j})}{\sum_{j' \in S_{new}} \exp(\hat{\vec{\beta}}_g \vec{z}_{new,j'})} \right)^{I(y_{new}=j)} \right\}$$

Fig. 16

ARTIFICIAL INTELLIGENCE BASED HOTEL DEMAND MODEL

CROSS REFERENCE TO RELATED APPLICATIONS

This application claims priority of U.S. Provisional Patent Application Ser. No. 63/215,688, filed on Jun. 28, 2021, the disclosure of which is hereby incorporated by reference.

FIELD

One embodiment is directed generally to a computer system, and in particular to a computer system that generates an artificial intelligence based hotel demand model.

BACKGROUND INFORMATION

Increased competition in the hotel industry has caused hoteliers to look for more innovative revenue management policies, such as personalized pricing and recommendations. Over the past few years, hoteliers have come to understand that not all guests are equal and a traditional one-size-fits-all policy might prove to be ineffective. Therefore, a need exists for hotels to profile their guests and offer them the right product/service at the right price with the goal of maximizing their profit.

SUMMARY

Embodiments generate a demand model for a potential hotel customer of a hotel room. Embodiments, based on features of the potential hotel customer, form a plurality of clusters, each cluster including a corresponding weight and cluster probabilities. Embodiments generate an initial estimated mixture of multinomial logit ("MNL") models corresponding to each of the plurality of clusters, the mixture of MNL models including a weighted likelihood function based on the features and the weights. Embodiments determine revised cluster probabilities and update the weights. Embodiments estimate an updated estimated mixture of MNL models and maximize the weighted likelihood function based on the revised cluster probabilities and updated weights. Based on the update weights and updated estimated mixture of MNL models, embodiments generate the demand model that is adapted to predict a choice probability of room categories and rate code combinations for the potential hotel customer.

BRIEF DESCRIPTION OF THE DRAWINGS

FIG. 5 is an example illustrating various offered prices, room categories and rate codes.

FIG. 8 illustrates the proposed likelihood function used with the EM functionality in accordance to embodiments.

FIG. 9 illustrates a portion of the EM functionality in accordance to embodiments.

FIG. 10 illustrates a portion of the EM functionality in accordance to embodiments.

FIGS. 11-16 illustrate an example of embodiments of the invention for three clusters.

DETAILED DESCRIPTION

Figure 1:
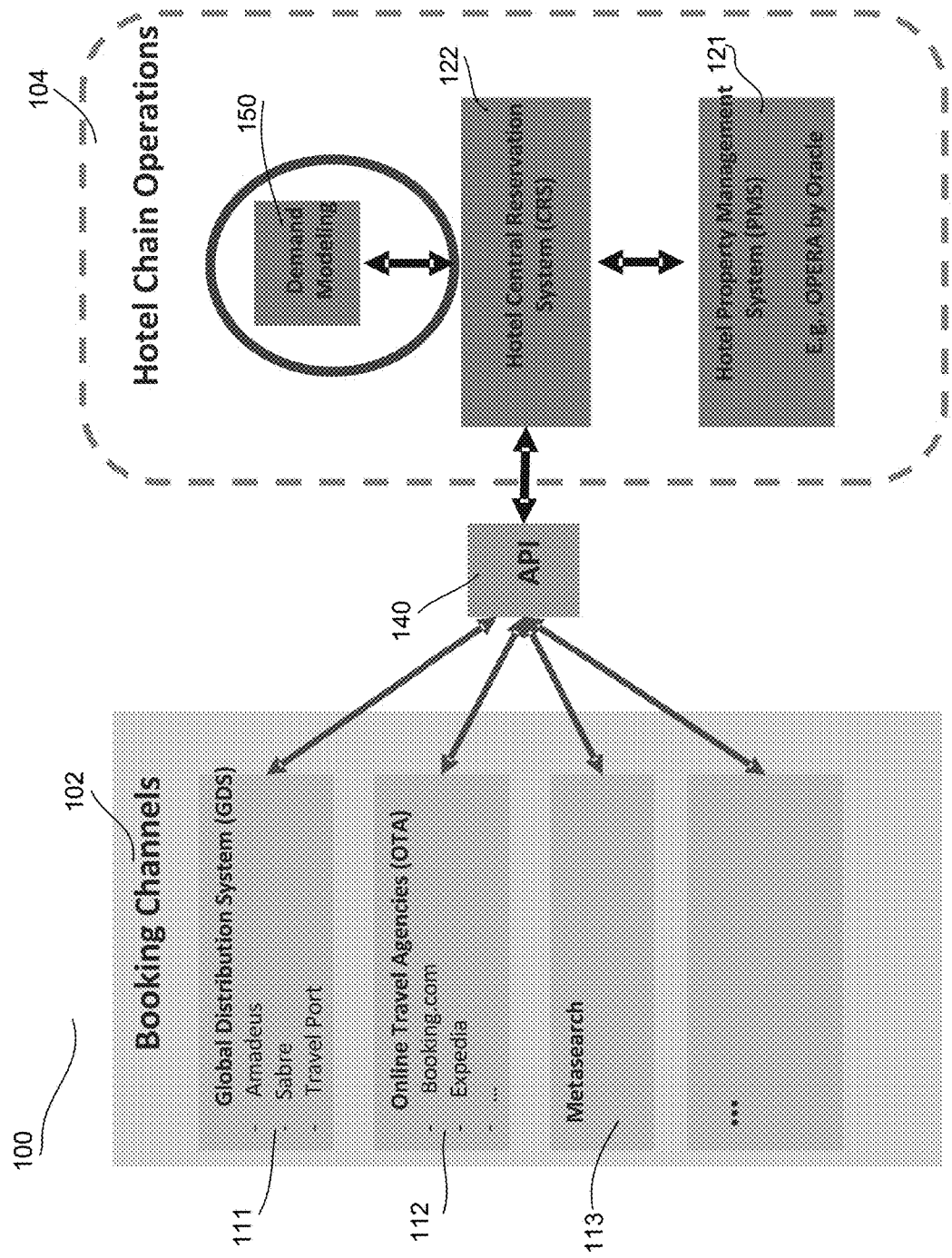
FIG. 1 is an overview block diagram of a hotel reservation system in accordance to embodiments of the invention.

Embodiments predict the choice of the hotel room category and associated service type by customers based on estimating parameters of discrete-choice models built on dynamically determined clusters of observations. Each observation corresponds to the choice made by a customer booking a room in the hotel and selecting an associated type of service from an ordered set of room categories and service type pairs offered at certain prices. Each room category and type of service is described by a set of features determining the customer's value, or utility, of the choice. In addition, each customer is characterized by a set of their own attributes determining the cluster to which the customer belongs, also known as the "persona type." It is assumed that each persona type may have its own utility of the booking choice.

The choice probability is modeled as a multinomial logit function based on the room-service pair utility for each persona type. Embodiments increase the accuracy of the prediction and build a basis for the prescriptive analytics application to optimize the personalized offer by maximizing the expected revenue. Embodiments can be used as a standalone system or as the central part of the personalized price optimization system for the personalized hotel rooms and the display optimization system for the order of the room category and rate code. Embodiments utilize iteratively reconfigurable dynamic clustering based on a semi-parametric mixture of discrete choice models to fully reflect a customers' choice behavior instead of using a static clustering traditionally used for this purpose.

In general, in the hotel industry, as well as other comparative industries, increased competition is driving more innovative revenue management practices such as personalized offers and pricing. Not all customers are the same, and a traditional one-size-fits-all policy might prove to be ineffective. Accurate estimation of demand as an input to a personalized recommendation system is crucial.

Embodiments address the need for a more accurate estimation of demand for hotel rooms by modeling the demand to account for heterogeneous customers with different: (1) Willingness-to-pay (indicated by the selected price range); (2) Rate plan selections (corporate discount, breakfast included, etc.); (3) Travel attributes; (4) Booking channels; (5) Booking windows; (6) Length of stay; (7) Date of arrival; and/or (8) Size of the group/family, number of children, etc. The factors influencing the choice can include room features, rate plan features, price, and the order in which the offers are shown.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 is an overview block diagram of a hotel reservation system 100 in accordance to embodiments of the invention. FIG. 1 includes booking channels 102 that a potential hotel customer may interact with to reserve a hotel room. The channels include a Global Distribution System ("GDS") 111, including "Amadeus", "Sabre", "Travel Port", etc., Online Travel Agencies ("OTA") 112, including "Booking.com", "Expedia", etc., Metasearch sites 113, and any other means for a customer to reserve a hotel room, including a website maintained by a hotel chain or individual hotel.

Each hotel chain operations 104 is accessed by an Application Programming Interface ("API") 140 as a Web Service such as a "WebLogic Server" from Oracle Corp. Hotel chain operations 104 includes a Hotel Property Management System ("PMS") 121, such as "OPERA Cloud Property Management" from Oracle Corp., a Hotel Central Reservation System ("CRS") 122, and a Demand Modeling module 150 that interfaces with systems 121 and 122 to provide optimized demand modeling as disclosed herein.

A hotel customer or potential hotel customer that uses system 100 to obtain a hotel room typically engages in a three stage booking process. First an area availability search is conducted. Multiple hotel chains are shown and hotel CRS 122 provides static data. The static data can include the min/max rate, available dates, etc.

If the booking customer selects a hotel, they go to the next step which is the property search, including a single hotel property, multiple rooms and rate plans. For the single hotel property, information may include room category description data, rate plan description and room price, each of which is shown in a specific order. The property search includes real-time availability data and results in the booking customer selecting a room. Once the room is selected, the final step is final booking and the reservation being guaranteed by a credit card or other form of payment.

Figure 2:
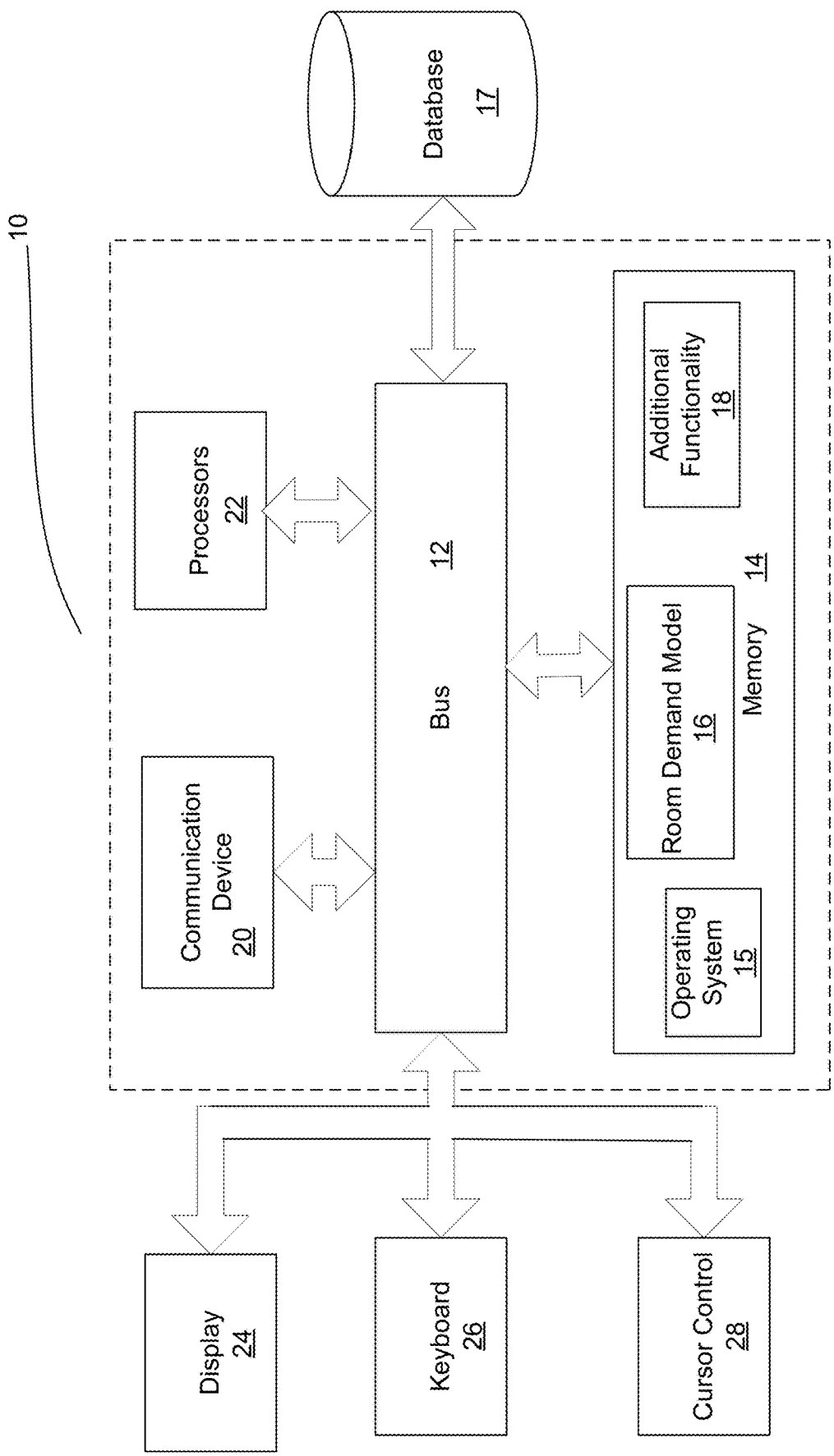
FIG. 2 is a block diagram of a computer server/system in accordance with an embodiment of the present invention.

FIG. 2 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, when implemented as a web server or cloud based functionality, system 10 is implemented as one or more servers, and user interfaces such as displays, mouse, etc. are not needed. In embodiments, system 10 can be used to implement any of the elements shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include room demand model module 16 that generates a room demand model to maximize the expected hotel room revenue, and all other functionality disclosed herein. As a hotel variable operating cost is relatively small, the expected revenue (i.e., the product of the room booking probability and room price) is the main optimization objective in embodiments. System 10 can be part of a larger system. Therefore, system 10 can include one or more additional functional modules 18 to include the additional functionality, such as the functionality of a Property Management System ("PMS") (e.g., the "Oracle Hospitality OPERA Property" or the "Oracle Hospitality OPERA Cloud Services") or an enterprise resource planning ("ERP") system. A database 17 is coupled to bus 12 to provide centralized storage for modules 16 and 18 and store guest data, hotel data, transactional data, etc. In one embodiment, database 17 is a relational database management system ("RDBMS") that can use Structured Query Language ("SQL") to manage the stored data.

In one embodiment, particularly when there are a large number of hotel locations, a large number of guests, and a large amount of historical data, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Embodiments solve the problem of predicting demand for multiple hotel room categories and service type combinations based on the hotel customer attributes, room category and service type features, offered price, and the order in which the room-rate pairs are presented to the customer. Rather than assuming homogeneous characteristics of the customers (i.e., where the expected demand should be the same when the same prices are offered), embodiments assume that the customer population includes several clusters to allow for customer characteristics and choice patterns to be heterogeneous across the clusters. In addition to predicting the demand of these heterogeneous customers (i.e., where the expected demand could be different, even when the same prices are offered), embodiments estimate the dynamic size of each cluster and centroid of each cluster recomputed over iterations to reflect the new assignments. The principal output of the problem is the probability of each individual customer booking a room in a specific room categories-service type combination.

Embodiments utilize a dynamic clustering approach to enable high-accuracy prediction of the room-service combination by a booking customer. Embodiments start with an initial clustering to divide customers into several clusters so that the characteristics of customers within each cluster can be more homogeneous than those from other clusters, and assume a personalized choice model within each cluster. Since cluster membership of customers (i.e., which cluster each customer belongs to) is unobservable, embodiments employ a soft clustering approach, in which the "mix" is captured through a customer's probability of belonging to each cluster.

To do so, embodiments implement unsupervised clustering using a random forest clustering algorithm with a certain number of clusters based on the characteristics of the potential hotel customers, orders of the room-service pairs, and their features, including the price offered. Next, embodiments derive a weighted likelihood function from the observed customers based on the discrete choice multinomial logit ("MNL") models corresponding to the clusters with the weights set to the cluster probabilities obtained from the initial clustering. Then, embodiments maximize the weighted likelihood function to obtain the values of coefficients of each covariate and the intercept in the MNL models. Choice probabilities for multiple hotel room categories-service type combinations for each customer are calculated from those values. The number of clusters is selected to the value that delivers the best accuracy of the prediction.

In embodiments, the initial clustering is based on the customer features, not their choices. To incorporate the choice behavior of customers into clustering, embodiments update the weights as the initial clustering probabilities multiplied by choice probabilities calculated at the previous step, which can be viewed as the E-step of the Expected-Maximization ("EM") algorithm. Then, embodiments re-fit the models with the newly formed clusters performing the dynamic clustering step by maximizing the updated weighted likelihood function, which constitutes the M-step of the EM algorithm. Finally, embodiments reiterate this E-step and M-step until the convergence criterion is met.

After the convergence, embodiments obtain the final estimates of the model parameters. For a new customer with their own characteristics, orders of the room-service pairs, and room category features, including the price offered, embodiments can predict the choice probabilities for the new customer after estimating their association with each cluster by solving a classification problem employing the supervised Random Forest classifier.

Dynamic Iteratively Reconfigurable Clustering Algorithm/Functionality

In general, embodiments implement a dynamic iteratively reconfigurable clustering algorithm/functionality for predicting demand in order to generate a hotel room demand model. Assume that a customer population of interest consists of multiple clusters G, where (G>1), where the pattern of booking a room is relatively homogeneous across customers within each cluster, while there is heterogeneity in booking patterns across clusters. Under this assumption, it is intuitive to consider different G choice models across clusters, i.e., a choice model fitted to each cluster separately. In practice, however, cluster membership indicating which cluster each customer belongs to is unobservable. In contrast, embodiments implement a novel algorithm/functionality to deal with the issue of estimating heterogeneous booking patterns of customers across clusters when cluster membership is unknown.

Specifically, assume that customer i is characterized by a set of observable covariates $\vec{x}_i$, for i=1, ..., n, where n is the number of customers in a data set. Let J be the number of products considered in a market, and $S_i$ be the set of available products to customer i, i.e., $S_i \subset \{1, \ldots, J\}$. Let $y_i$ denote the product choice made by customer i, where $y_i \in S_i$. Product j=1, ..., J is characterized by a set of observable variables $\vec{z}_j$. Then, the MNL room selection probability within cluster g can be expressed as follows. Letting $\ell_i$ be a cluster membership indicator for customer i, $$P(y_i = j \mid \ell_i = g) = \frac{\exp\left(\alpha_j^g + \vec{\beta}_g \vec{z}_{ij}\right)}{\sum_{k \in S_i} \exp\left(\alpha_k^g + \vec{\beta}_g \vec{z}_{ik}\right)} \quad (1)$$

where $\alpha_B^g = 0$ for identifiability and $B \in \{1, \ldots, J\}$ is the baseline product. In embodiments, B=J is set to demonstrate embodiments of the invention. Since the cluster membership indicator $\ell_i$ is unobservable, this is regarded as a latent variable and a model is needed to explain different probabilities of belonging to a cluster across different customer features. Specifically, assume a model for $\ell_i$, called mixing distribution, as follows:

$$P(\ell_i = g \mid x_i) = f_g(\vec{x}_i) \quad (2)$$

where $f_g(\vec{x}_i)$ is a generic notation for a probability mass function which depends on $\vec{x}_i$, which is unknown.

One general approach to model $\ell_i$ is to assume an MNL (as known as logit) model, which specifies that a customer belongs to cluster g with probability $$P(\ell_i = g \mid \vec{x}_i) = f_g(\vec{x}_i) = \frac{\exp(\vec{\delta}_g \vec{x}_i)}{\sum_{h=1}^{G} \exp(\vec{\delta}_h \vec{x}_i)}, \quad (3)$$

where embodiments set $\vec{\delta}_1 = \vec{0}$ for identifiability. The vector $\vec{\delta}_g$ specifies how customer features affect in clustering, i.e., which cluster the customer belongs to. However, unlike the product choice $y_i$, the cluster membership indicator $\ell_i$ is unobservable, thus, the true structure of the mixing distribution is not known in practice and hard to test if the specified model is correct. A pre-specified parametric family for the mixing distribution as in equation (1) may not be consistent with the true mixing distribution, referred to as model misspecification problem, which leads to biased parameter estimates or low goodness-of-fit measures, which affects prediction accuracy.

To avoid such a model misspecification and improve a prediction performance, embodiments implement a semi-parametric mixture of discrete choice models by assuming equations (1) and (2) rather than equations (1) and the MNL model (3). Letting the model parameters denote $\vec{\theta} = \{\alpha_j^g, \vec{\beta}_g : j=1, \ldots, J-1, g=1, \ldots, G\}$, then, the likelihood function of $\vec{\theta}$ is written as $$L(\vec{\theta}) = \prod_{i=1}^{n} \sum_{g=1}^{G} P(\ell_i = g \mid \vec{x}_i) \prod_{j \in S_i} \left\{ \frac{\exp(\alpha_j^g + \vec{\beta}_g \vec{z}_{ij})}{\sum_{k \in S_i} \exp(\alpha_k^g + \vec{\beta}_g \vec{z}_{ik})} \right\}^{I(y_i = j)} \quad (4)$$

where there is not imposed any pre-specified parametric model form for $P(\ell_i = g \mid \vec{x}_i)$ which can be estimated by using any nonparametric clustering method such as random forest. Other unsupervised machine learning techniques for clustering can also be used in other embodiments. Then, embodiments use the same idea of EM algorithm as follows. Suppose that the latent clustering membership indicator $\ell_i$ is known. Then, the complete likelihood function is $$L_{com}(\vec{\theta}) =$$

$$\prod_{i=1}^{n} \sum_{g=1}^{G} P(\ell_i = g \mid \vec{x}_i)^{I(\ell_i = g)} \left[ \prod_{j \in S_i} \left\{ \frac{\exp(\alpha_j^g + \vec{\beta}_g \vec{z}_{ij})}{\sum_{k \in S_i} \exp(\alpha_k^g + \vec{\beta}_g \vec{z}_{ik})} \right\}^{I(y_i = j)} \right]^{I(\ell_i = g)}$$

and the complete log-likelihood function is $$\ell_{com}(\vec{\theta}) = \log L_{com}(\vec{\theta}) =$$

$$\sum_{i=1}^{n} \sum_{g=1}^{G} I(\ell_i = g) \log P(\ell_i = g \mid \vec{x}_i) \sum_{j \in S_i} I(y_i = j) \log \frac{\exp(\alpha_j^g + \vec{\beta}_g \vec{z}_{ij})}{\sum_{k \in S_i} \exp(\alpha_k^g + \vec{\beta}_g \vec{z}_{ik})}.$$

In the EM algorithm, the maximizer of the objective function of equation (4) can be found by using the following iterative method:

$$\vec{\theta}^{(t+1)} \leftarrow \text{solve } E\left\{ \frac{\partial \ell_{com}(\vec{\theta})}{\partial \vec{\theta}} \bigg| y, x, z; \vec{\theta}^{(t)} \right\} = 0. \quad (5)$$

Specifically, embodiments repeat the following E-step and M-step as follows.

E-Step

Compute the conditional expectation of $\ell_i$ given the observed data $$\{y, x, z\} = \{y_i, \vec{x}_i, \vec{z}_{ij} : i=1, \ldots, n, j \in S_i\}$$

$$\pi_{ig}^{(t)} = E\ell_i = g \mid y, x, z; \vec{\theta}^{(t)} = P\ell_i = g \mid y, x, z; \vec{\theta}^{(t)}$$

M-Step

Update the parameter $\vec{\theta}$ by solving the equation:

$$E\left\{ \frac{\partial \ell_{com}(\vec{\theta})}{\partial \vec{\theta}} \bigg| y, x, z; \vec{\theta}^{(t)} \right\} =$$

$$\sum_{i=1}^{n} \sum_{g=1}^{G} \pi_{ig}^{(t)} \sum_{j \in S_i} I(y_i = j) \frac{\partial}{\partial \vec{\theta}} \left\{ \log \frac{\exp(\alpha_j^g + \vec{\beta}_g \vec{z}_{ij})}{\sum_{k \in S_i} \exp(\alpha_k^g + \vec{\beta}_g \vec{z}_{ik})} \right\}.$$

As disclosed, embodiments employ an unsupervised clustering technique, such as random forest, based on customer features. Thus, the EM algorithm can be adjusted to a context, referred to as iterative reconfigurable clustering, as follows.

Initial Clustering:

Perform learning an unsupervised soft clustering (e.g., random forest, k-means) with G. Clusters based on the customer-level covariates $\{\vec{x}_{ij} : i=1, \ldots, n\}$ and obtain the clustering probabilities for each cluster, $p_{i1}^{(0)}, \ldots, p_{iG}^{(0)}$, such that $\sum_{g=1}^{G} p_{ig}^{(0)} = 1$, where $p_{ig}^{(0)}$ is the initial estimate of $P(\ell_i = g \mid \vec{x}_i)$. With $p_{i1}^{(0)}, \ldots, p_{iG}^{(0)}$, we find the initial parameter values by solving the equations:

$$\sum_{i=1}^{n} p_{ig}^{(0)} \left\{ \sum_{j \in S_i} I(y_i = j) - \frac{\exp(\alpha_j^g + \vec{\beta}_g \vec{z}_{ij})}{\sum_{k \in S_i} \exp(\alpha_k^g + \vec{\beta}_g \vec{z}_{ik})} \right\} (1, \vec{z}_{ij}) = (0, \vec{0}).$$

E-Step

Embodiments determine the conditional cluster probabilities by using the observed choice and the fitted discrete choice model as follows: if $y_i = j$, $$\pi_{ig}^{(t)} = P(\ell_i = g \mid y_i = j, \vec{x}_i, \vec{z}_i) \propto$$

$$p_{ig}^{(0)} \times \frac{\exp(\vec{\beta}_g^{(t)} \vec{z}_{ij})}{\sum_{j \in S_i} \exp(\vec{\beta}_g^{(t)} \vec{z}_{ij})} \text{ such that } \sum_{g=1}^{G} \pi_{ig}^{(t)} = 1.$$

M-Step

Update the choice model parameters to $\alpha_j^{g(t+1)}$ and $\vec{\beta}_g^{(t+1)}$ by solving the following equations. For each g, first find the solutions of $\alpha_j^g$ for j=1, ..., J−1 from the equation as follows.

$$\sum_{i=1}^{n} \pi_{ig}^{(t)} \left\{ \sum_{j \in S_i} I(y_i = j) - \frac{\exp\left(\alpha_j^g + \vec{\beta}_g^{(t)} \vec{z}_{ij}\right)}{\sum_{k \in S_i} \exp\left(\alpha_k^g + \vec{\beta}_g^{(t)} \vec{z}_{ik}\right)} \right\} = 0.$$

Then obtain $\vec{\beta}_g^{(t+1)}$ by solving the equation with respect to $\vec{\beta}_g$:

$$\sum_{i=1}^{n} \pi_{ig}^{(t)} \left\{ \sum_{j \in S_i} I(y_i = j) - \frac{\exp\left(\alpha_j^{g(t+1)} + \vec{\beta}_g \vec{z}_{ij}\right)}{\sum_{k \in S_i} \exp\left(\alpha_k^{g(t+1)} + \vec{\beta}_g \vec{z}_{ik}\right)} \right\} \vec{z}_{ij} = \vec{0},$$

where $g = 2, \ldots, G$.

Repeat the (E-step) and the (M-step) until the convergence criterion as $\|\vec{\theta}^{(t+1)} - \vec{\theta}^{(t)}\|_2 < \epsilon$ is met for any $\epsilon > 0$.

The above can be viewed as a variant of the EM algorithm. In embodiments, the "Theorem of Dempster et al. (1977)" can be applied to the proposed iterative algorithm, which says that the solution $\{\vec{\theta}^{(t)}\}$ converges to $\vec{\theta}^*$, where $\vec{\theta}^*$ is the maximizer of our objective function, $L(\vec{\theta})$.

Prediction of Room Categories and Rate Codes Combination

After convergence, embodiments obtain the final estimate of the model parameters $\{\alpha_j^g, \vec{\beta}_g: j=1, \ldots, J; 1, g=1, \ldots, G\}$. For a new customer characterized by $\vec{x}^*$, embodiments predict the choice probabilities as follows: letting $S^*$ be the available products, for $j \in S^*$, $$P(y^* = j \mid \vec{x}^*, \vec{z}^*) = \sum_{g=1}^{G} p_g^* \frac{\exp\left(\alpha_j^g + \vec{\beta}_g \vec{z}_{ij}^*\right)}{\sum_{k \in S_i} \exp\left(\alpha_k^g + \vec{\beta}_g \vec{z}_{ik}^*\right)},$$

where $p_g^*$ is the predicted probability of belonging to cluster g by the soft clustering, and $\vec{z}_j^*$ is a feature vector of room j available to the new customer.

Figure 3:
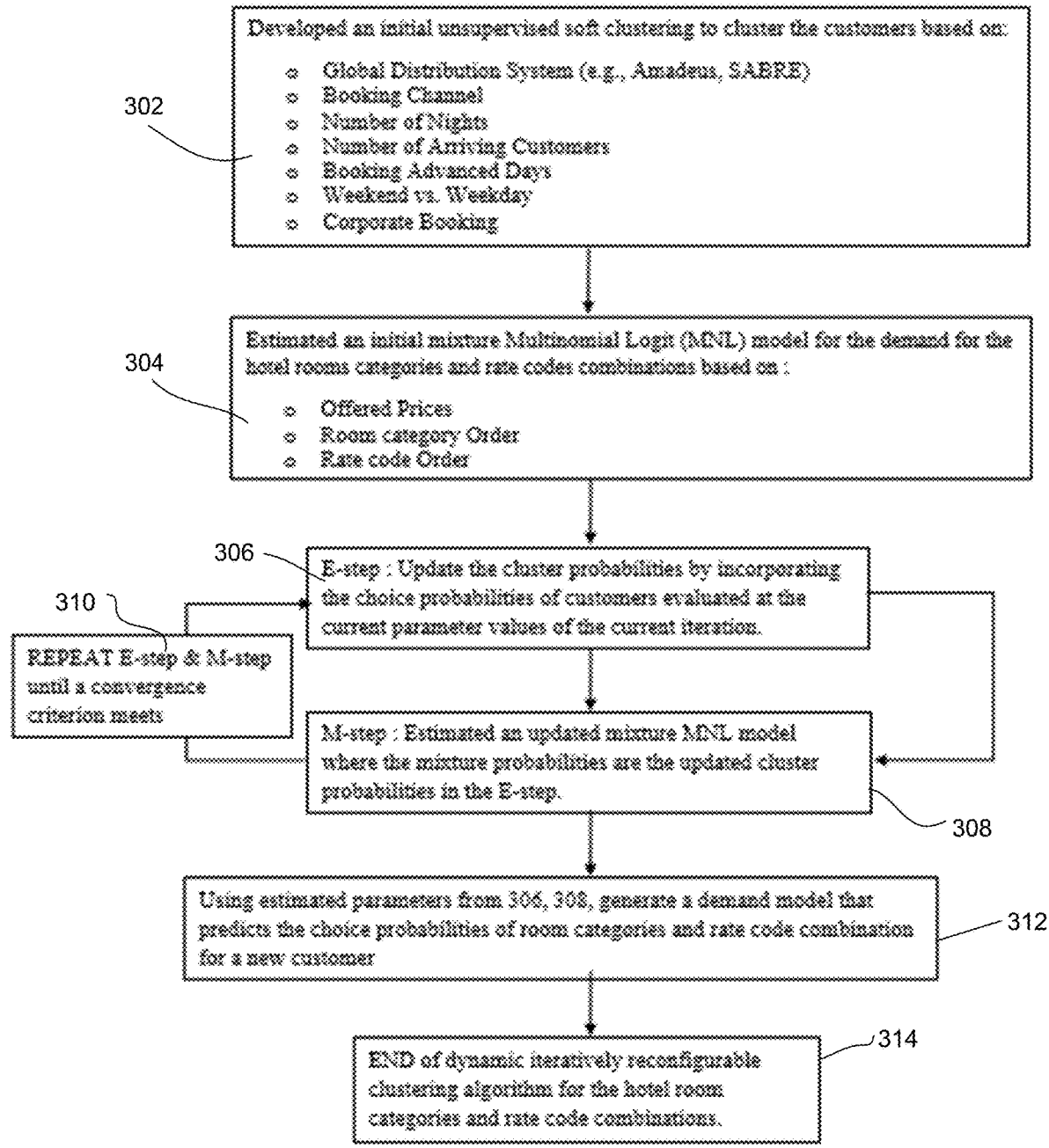
FIG. 3 is a flow diagram of the functionality of the room demand model module of FIG. 2 for generating a room demand model in accordance with one embodiment.

FIG. 3 is a flow diagram of the functionality of room demand model module 16 of FIG. 2 for generating a room demand model in accordance with one embodiment. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, an initial unsupervised soft clustering is developed to cluster customers based on a plurality of attributes/characteristics assigned to each customer. In embodiments, the attributes can include one or more of: (1) the global distribution system being used (e.g., Amadeus, SABRE, etc.); (2) the booking channel; (3) the number of nights; (4) the number of arriving customers; (5) booking advanced days; (6) weekend vs. weekday; (7) corporate booking.

The initial clustering at 302 is based on the customer features, not the customer choices. Customer features are those features that are known at the time of the request for the room, and include such data as the arrival date and time, the number in the party, and the booking channel. In addition, the customer feature data includes other inferred features such as the booking window (i.e., the time between the booking and arriving date).

The initial clustering, as well as the dynamic clustering which is described below where the initial clustering and subsequent clustering is dynamically updated, both incorporate machine learning. Specifically, the initial clustering at 302 can incorporate any unsupervised machine learning techniques for clustering, such as random forest, or soft clustering algorithms using Gaussian mixture models. Unlike with the choice of customers, the cluster membership is unobservable and therefore it is more challenging to assume a pre-specified parametric model about how clusters are formed based on the customer characteristics, and hard to test if the pre-specified parametric model is correct or not. Failure to specify a correct model leads to biased parameter estimates or low goodness-of-fit measures which affects prediction accuracy. Since embodiments do not require any pre-specified parametric model form for clustering structure, possible biases from model mis-specification can be avoided.

Figure 4:
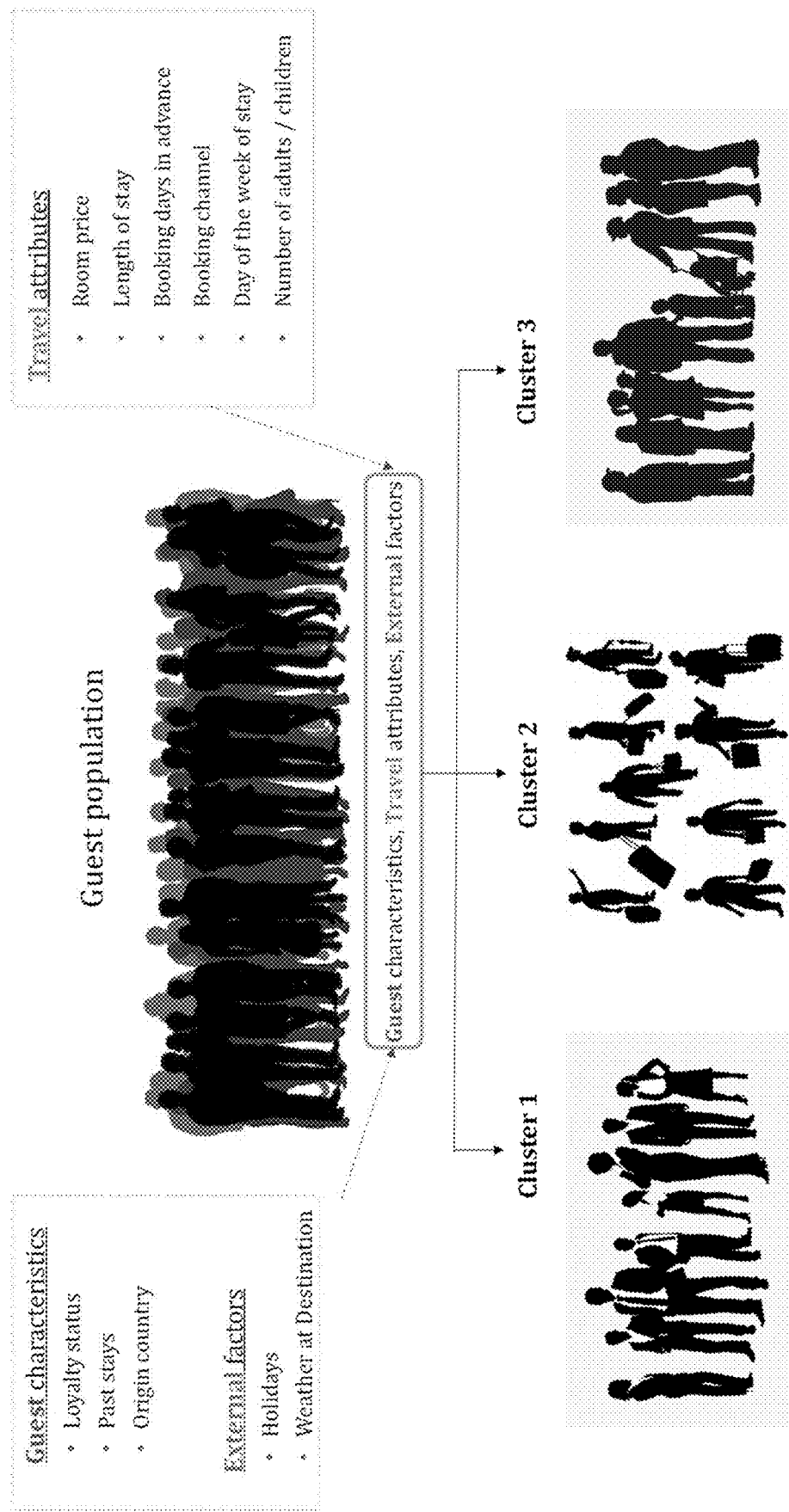
FIG. 4 illustrates an example of the initial clustering in accordance with embodiments.

FIG. 4 illustrates an example of the initial clustering in accordance with embodiments. As shown in FIG. 4, based on the guest characteristics, external factors and travel attributes, three clusters are formed. In embodiments, the number of clusters is a predefined parameter based on the interpretability of the clustering, which typically limits the number of clusters to single digits. In various embodiments, two to four clusters are used.

At 304, embodiments estimate an initial mixture of Multinomial Logit ("MNL") models for the demand for the hotel room categories and rate codes combinations based on parameters related to the hotel room offerings, including: (1) Offered prices; (2) Room category and rate plan position in the offer; and (3) Room and rate features such as view, room size, whether the breakfast included, free cancellation, etc. For each cluster formed at 302, a separate MNL model is built at 304. FIG. 5 is an example illustrating various offered prices (e.g., $335), room categories (e.g., deluxe or superior. king or queen bed) and rate codes (e.g., "Breakfast Included Rate"). At 304, the historical booking data stored in a database (e.g., database 17 of FIG. 2) in order to estimate the $\vec{\theta}$ parameter defined in conjunction with equation (4) above on by solving equation (5) above.

Figure 6:
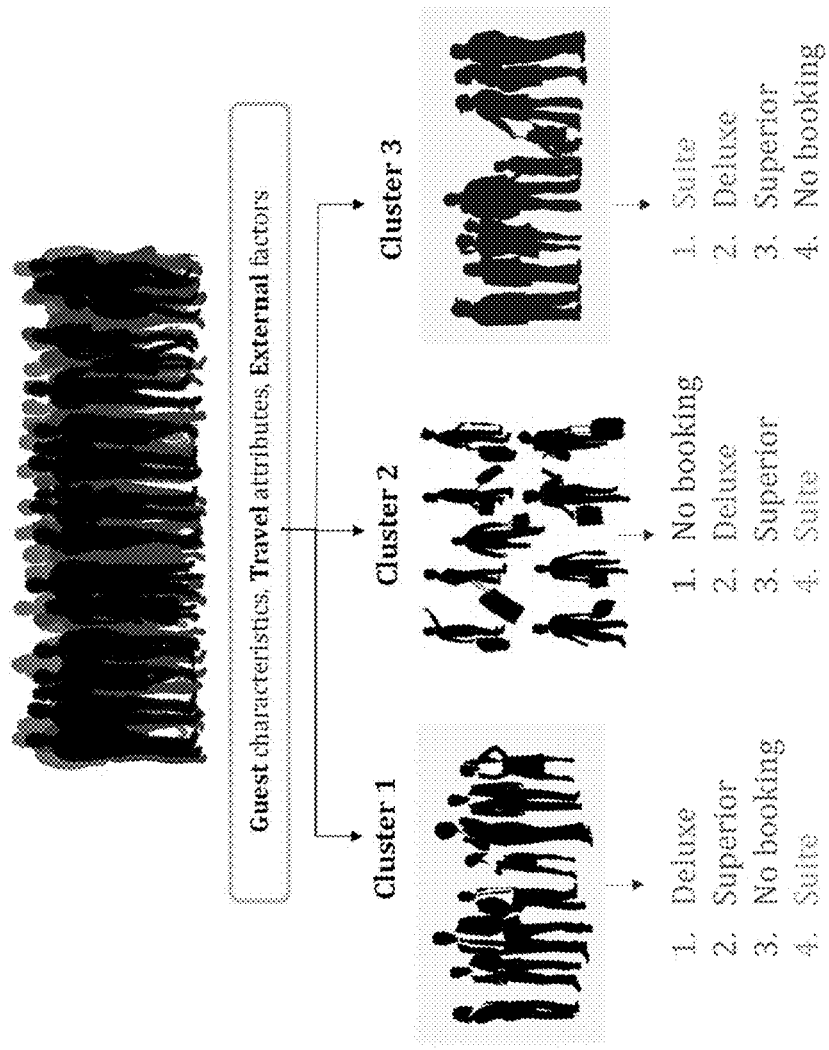
FIG. 6 illustrates the choice modeling for guest clusters in accordance to example embodiments.
Figure 7:
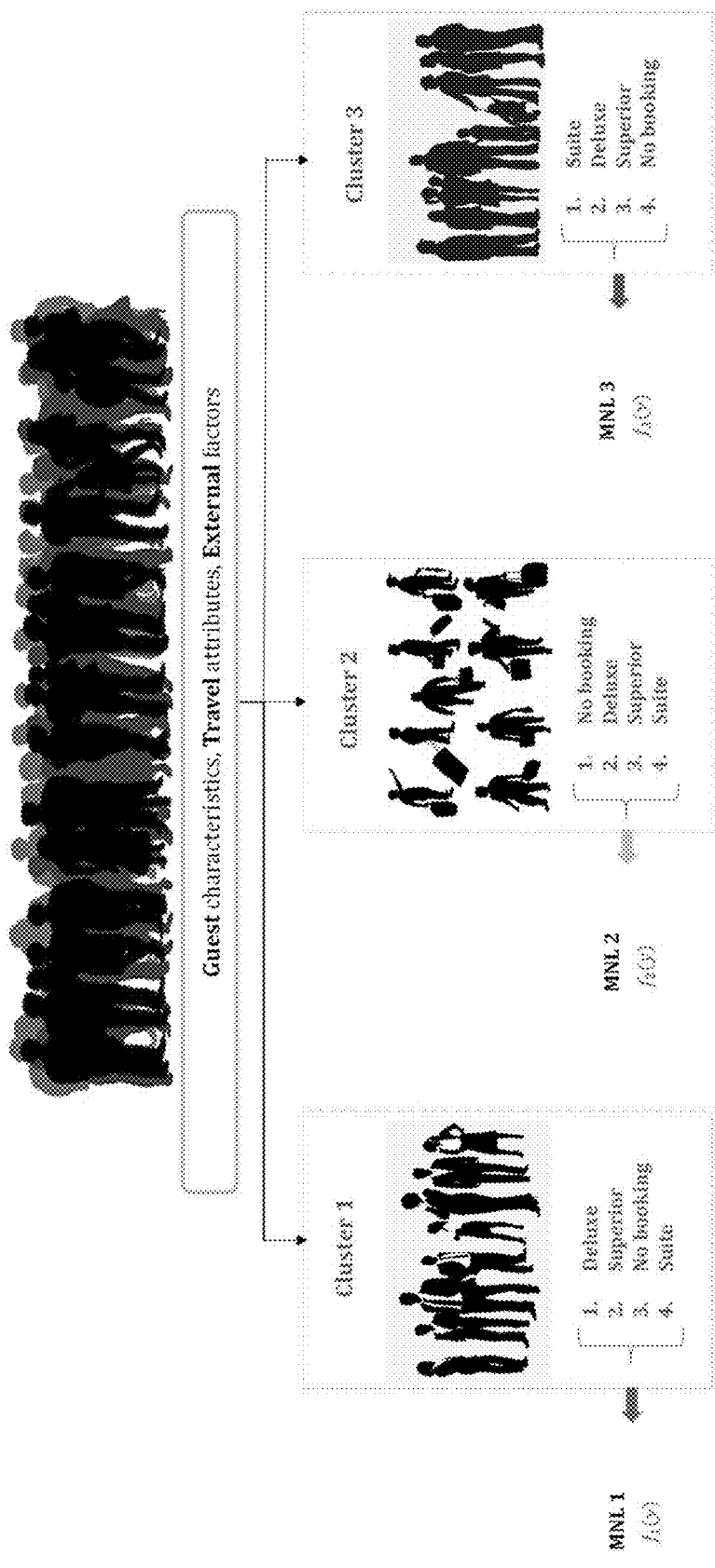
FIG. 7 illustrates the initial assignment of an MNL model to each cluster in accordance to embodiments.

FIG. 6 illustrates the choice modeling for guest clusters in accordance to example embodiments. As shown in FIG. 6, each cluster uses a unique discrete choice model to predict the choice of the hotel room and rate code combination for each customer. FIG. 7 illustrates the initial assignment of an MNL model to each cluster in accordance to embodiments.

306, 308 and 310, collectively and on an iterative basis, form an Expectation Maximization ("EM") functionality. The EM functionality includes 306, 308, and 310, where it also contains the soft-clustering which is updated in E-step at 306. Soft clustering at 302 is an initial clustering which is not repeated. At 306, for the Expectation "E-step", the cluster probabilities are updated by incorporating the choice probabilities of customers evaluated at the parameter values of the current iteration.

FIG. 8 illustrates the proposed likelihood function used with the EM functionality in accordance to embodiments. As shown, the proposed likelihood function includes both the cluster model generated at 302 and shown in FIG. 4, and the choice model generated at 304 and shown in FIG. 6. The proposed likelihood function is the objective function of the EM functionality. Embodiments find a maximizer of this objective function to estimate the model parameters by using the EM functionality.

FIG. 9 illustrates a portion of the EM functionality in accordance to embodiments. After the "Initial Step", which is the soft clustering performed at 302, the Expectation E-Step is determined at 306.

At 308 for the Maximization "M-step", embodiments estimate an updated mixture of MNL models where the mixture probabilities are the updated cluster probabilities in the E-step. At 310, 306 and 308 are repeated until the convergence criteria: |New Prediction Error–Old Prediction Error|<0.0001, is met.

At 312, using estimated parameters from 306, 308, a demand model is generated that predicts the choice probabilities of room categories and rate code combination for a new customer. At 314, the functionality ends.

The functionality of FIG. 3 combines the estimation of discrete choice modeling with a data-driven identification of customer segments and captures varying preferences of a heterogeneous customer population and provides interpretable model outputs. The demand model generated at 312 provides a practical approach that can help hoteliers profile their customers/guests based on their preferences, which can serve as a valuable input to: (1) formulate more efficient marketing policies and offer personalized recommendations that are more likely to be accepted; and (2) generate optimal personalized prices and display positions for each room type (e.g., suite with water view and queen bed).

FIG. 10 illustrates a portion of the EM functionality in accordance to embodiments. FIG. 10 illustrates the M-step at 308 and the repeat until convergence at 310.

Figure 11:
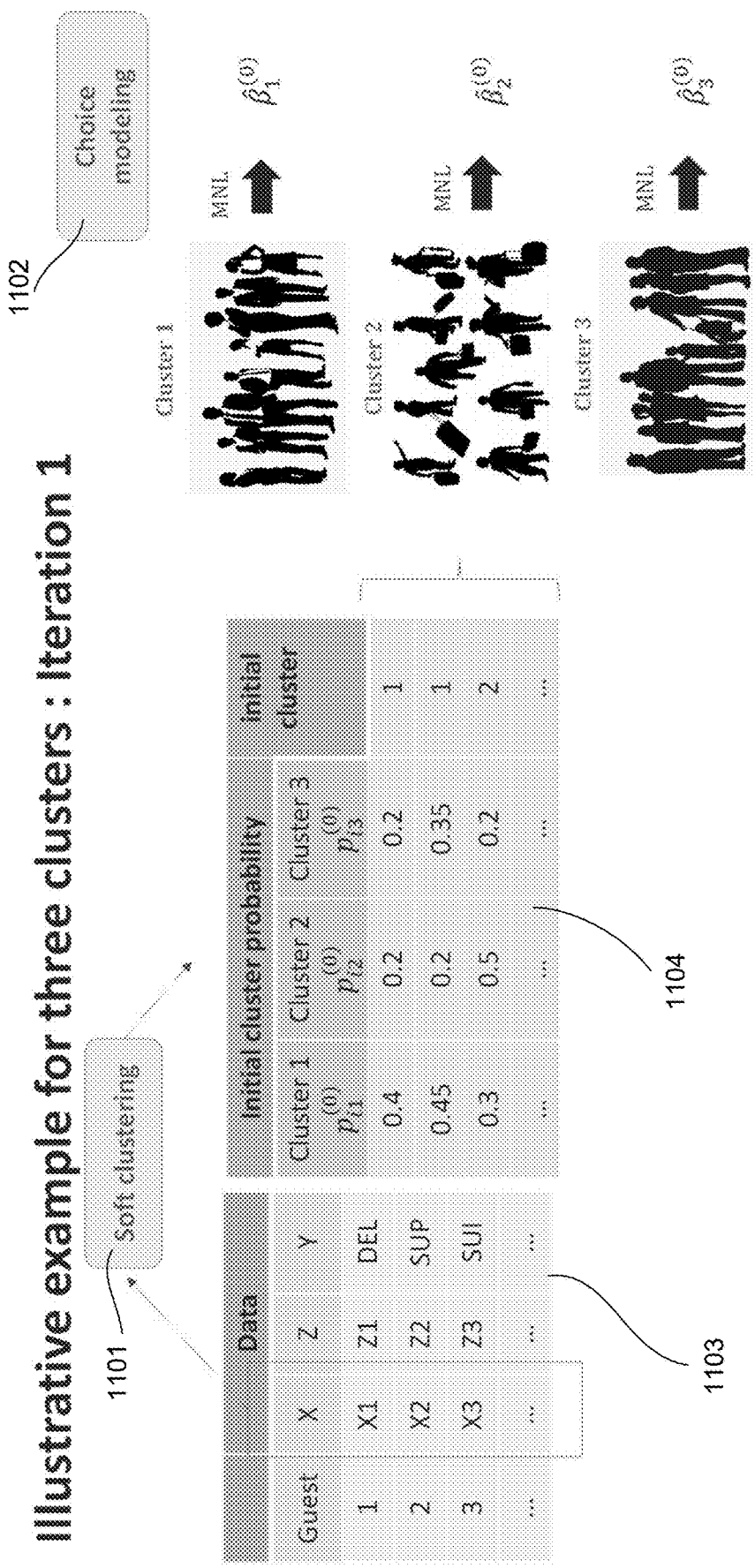

FIGS. 11-16 illustrate an example of embodiments of the invention for three clusters. FIG. 11 illustrates the soft clustering (302 of FIG. 3) at 1101 and the choice modeling (304 of FIG. 3) at 1102, where a different MNL model is generated for each of the clusters from the soft clustering. The number of clusters is pre-determined before the EM functionality is used. To choose the best number of clusters, prediction accuracy measures are compared across several different numbers of clusters, and the best number achieving the most accurate prediction is selected. There is a different MNL for each cluster but all of the model parameters are jointly estimated. The initial data 1103 for each guest is used as input and an initial cluster probability 1104 is generated for each guest.

Figure 12:
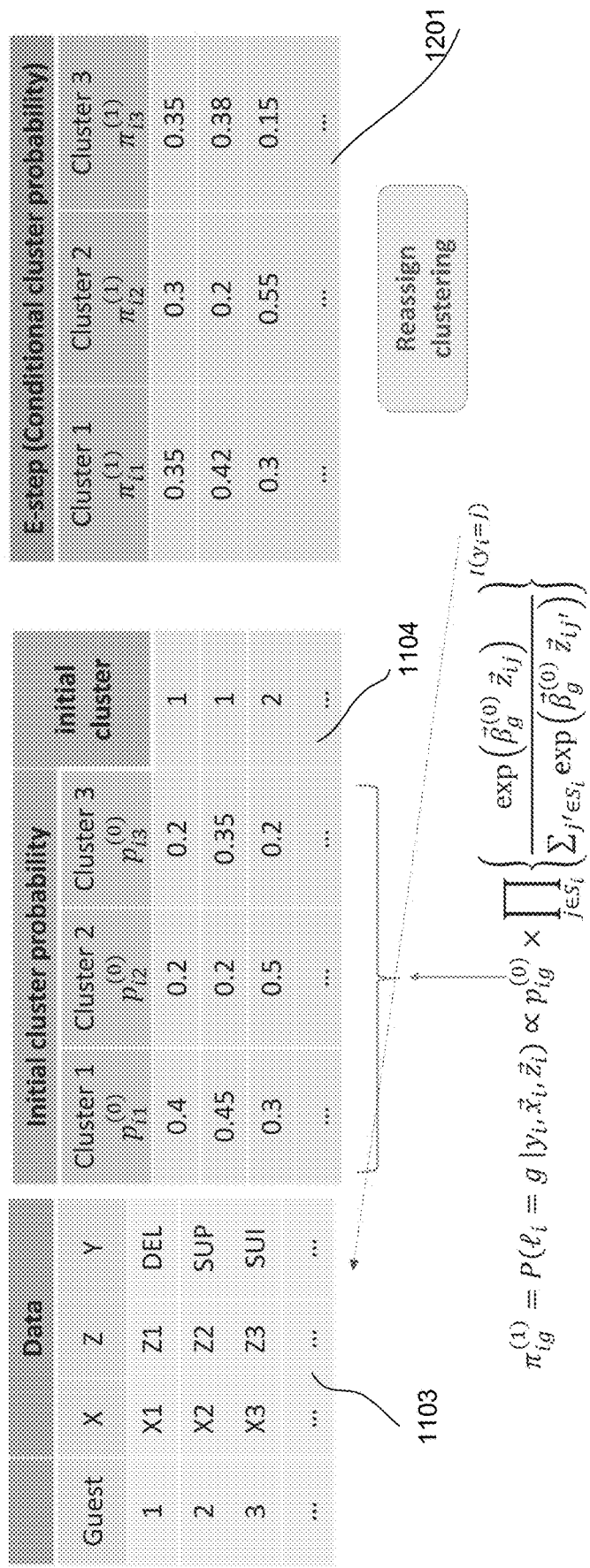

FIG. 12 illustrates the first iteration (306 and 308 of FIG. 3) which uses the E-step to reassign the conditional cluster probability at 1201.

Figure 13:
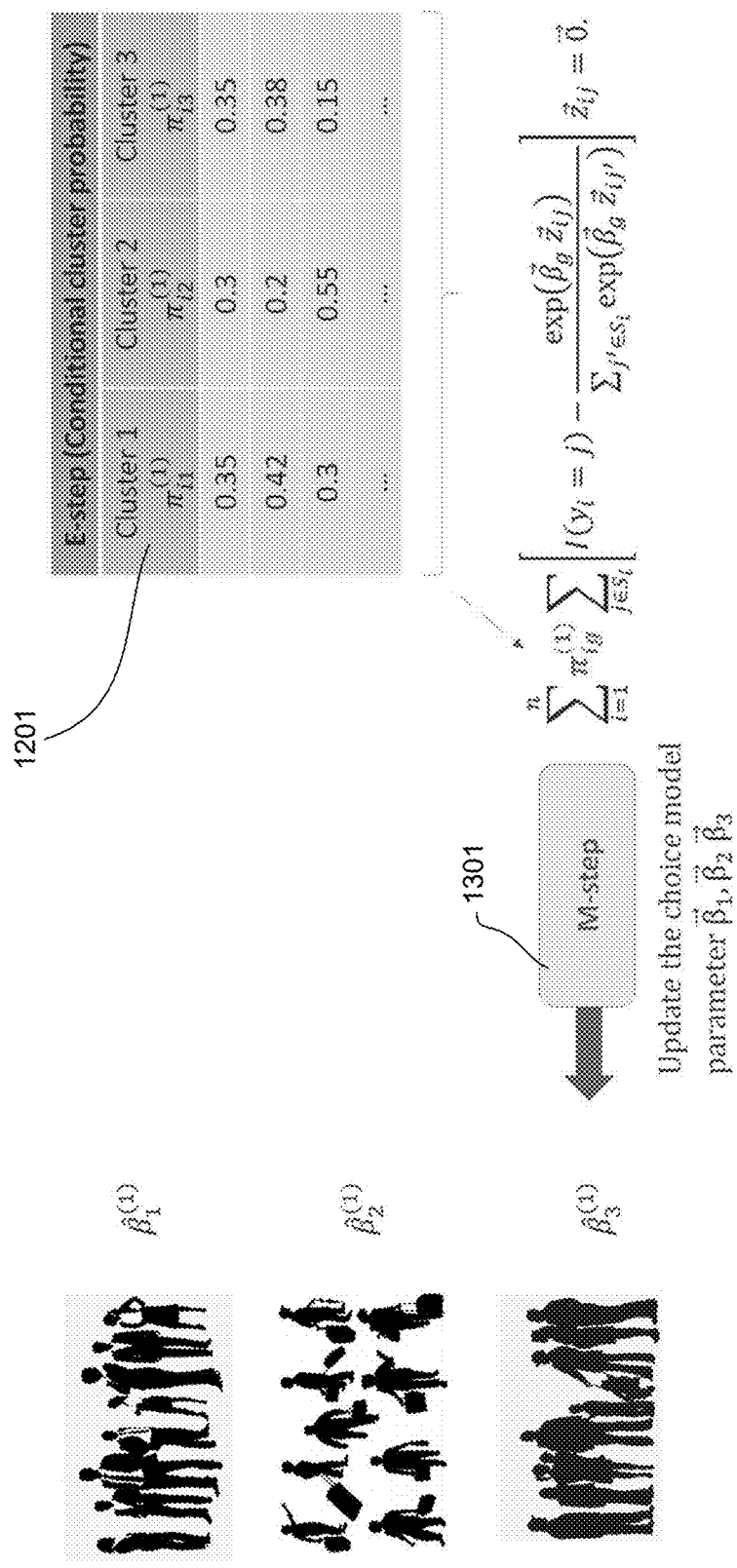

FIG. 13 illustrates the first iteration (306 and 308 of FIG. 3) which uses the M-step to update the choice model at 1301, which revises the conditional cluster probability.

Figure 14:
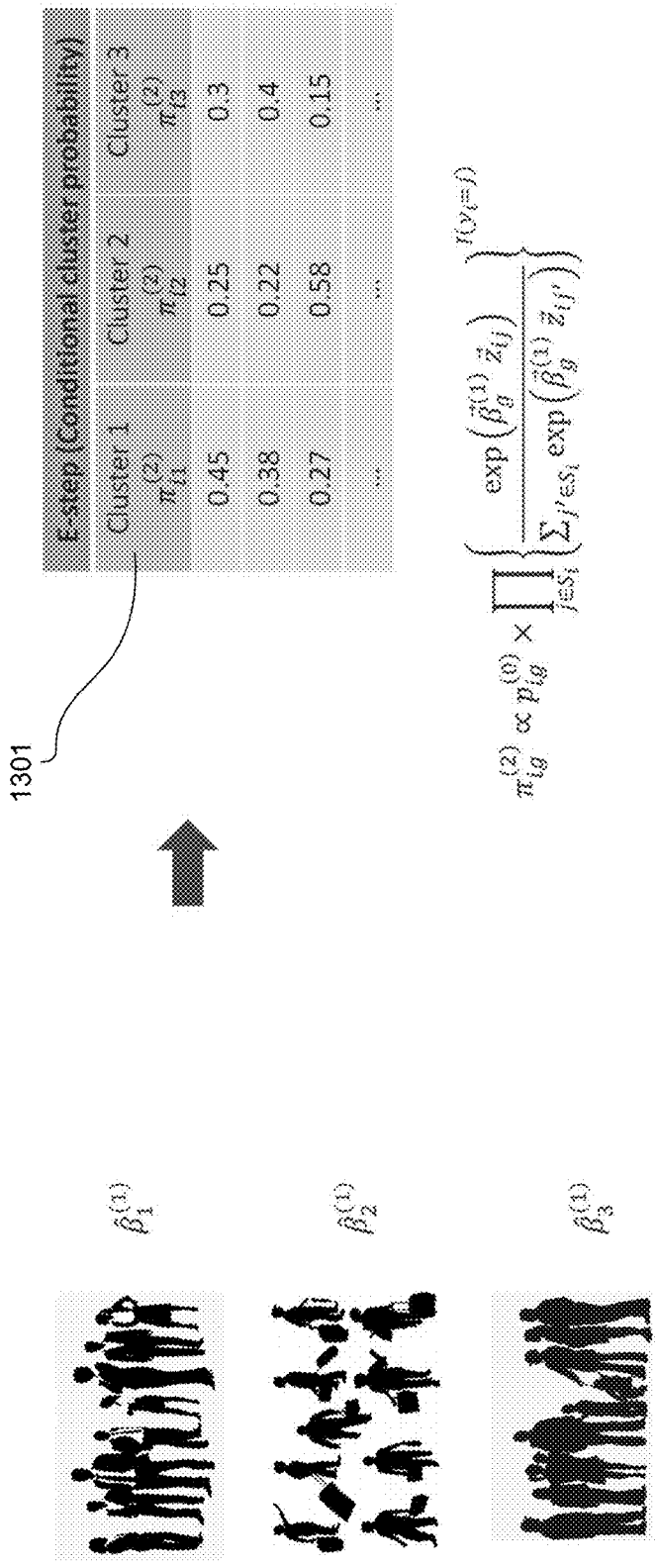
Figure 15:
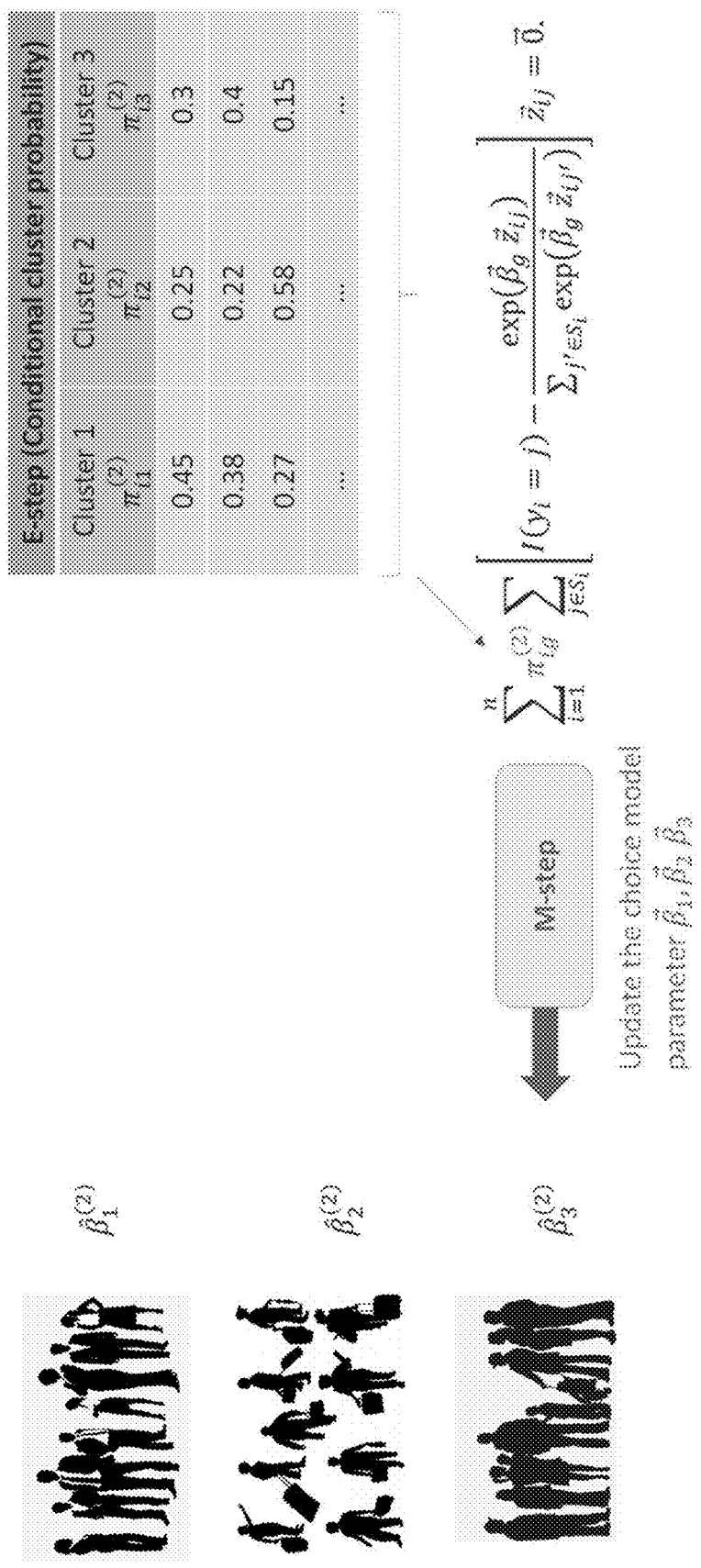

FIG. 14 illustrates the second iteration using the E-step the updated conditional cluster probability at 1301 and FIG. 15 illustrates the second iteration using the M-step. For purposes of illustration, assume only two iterations.

FIG. 16 then illustrates the generation of the demand model using the estimated model parameters that forms a prediction of a choice probability of a new customer.

Metrics for Assessment

To investigate the performance the iterative reconfigurable clustering in accordance to embodiments, embodiments divide the dataset into a training and a test dataset. After estimating the model parameters as well as initial clustering from the training data, embodiments obtain the predicted values of the product choices among the customers in the test data. For prediction accuracy measurements, embodiments use the correct classification ratio ("CCR") and mean squared error ("MSE").

The CCR is calculated as the percentage of the observations where the option with highest predicted probability coincides with the observed choice.

The MSE is calculated as:

$$MSE = \frac{\sum_{i \in \phi_{te}} \sum_{j \in S_i} (I(y_i = j) - \hat{p}_{ij})^2}{n_{te}},$$

where $y_i$ and $\hat{p}_{ij}$ are the true and predicted choices of customer i for room type j, $\phi_{te}$ is the index set of customers in the test data, and $n_{te}$ is the number of customers in the test data. This metric is also referred to as the Brier score, which is commonly used in evaluating probabilistic predictions.

In experiments, embodiments were applied using a real hotel dataset by utilizing the proprietary dataset of multiple hotels from multiple cities and countries. The data includes reservation information, and corresponding customer characteristics. Further, the log data (i.e., real time customers' request for a reservation and the corresponding response by the reservation server system) is included. From this log, information was extracted on the display order of rooms and rate codes. This order is strategically inputted by each hotelier so that each customer has various display orders. The final dataset included 9,173 reservations from Jul. 2, 2019 to Jul. 19, 2019 with 18 different rooms and 15 various rate codes.

Embodiments first find the number of optimal clusters in the customer population, which is usually unknown. Embodiments employ the prediction criteria approach to select the number of optimal clusters. In particular, embodiments employ the MSE and choose the number of clusters which has the highest prediction accuracy among 2, 3, 4, and 5 clusters. Experiments determine that 2 clusters have the best performance among 4 options.

Given 2 clusters, embodiments implement embodiments of the invention using the real hotel reservation dataset. Specifically, the prediction accuracy of embodiments is compared against a single cluster benchmark. Embodiments partition each dataset into training (80%) and test datasets (20%). The results are presented below in Table 1 where the iterations are stopped at 17 since the criteria based on MSE is met (i.e., close to 0.0001):

TABLE 1

Comparison of prediction accuracy over iterations using MSE and CCR

| | Single Cluster | | 2 Clusters | | |
|---|---|---|---|---|---|
| Iteration | CCR | MSE | CCR | MSE | Criteria |
| 0 | 0.56160 | 0.5832 | 0.5627 | 0.5823 | — |
| 1 | — | — | 0.5572 | 0.5802 | 0.0021 |
| 2 | — | — | 0.5660 | 0.5765 | 0.0037 |
| 3 | — | — | 0.5816 | 0.5731 | 0.0034 |
| 4 | — | — | 0.5871 | 0.5708 | 0.0023 |

TABLE 1-continued

Comparison of prediction accuracy over iterations using MSE and CCR

| | Single Cluster | | 2 Clusters | | |
|---|---|---|---|---|---|
| Iteration | CCR | MSE | CCR | MSE | Criteria |
| 5 | — | — | 0.5882 | 0.5692 | 0.0016 |
| 6 | — | — | 0.5938 | 0.5679 | 0.0013 |
| 7 | — | — | 0.5949 | 0.5665 | 0.0014 |
| 8 | — | — | 0.5927 | 0.5651 | 0.0014 |
| 9 | — | — | 0.5916 | 0.5636 | 0.0015 |
| 10 | — | — | 0.5893 | 0.5624 | 0.0012 |
| 11 | — | — | 0.5916 | 0.5610 | 0.0014 |
| 12 | — | — | 0.5916 | 0.5603 | 0.0007 |
| 13 | — | — | 0.5949 | 0.5596 | 0.0007 |
| 14 | — | — | 0.5927 | 0.5594 | 0.0002 |
| 15 | — | — | 0.5971 | 0.5586 | 0.0007 |
| 16 | — | — | 0.5971 | 0.5580 | 0.0007 |
| 17 | — | — | 0.5971 | 0.5579 | 0.0001 |

Figure 17:
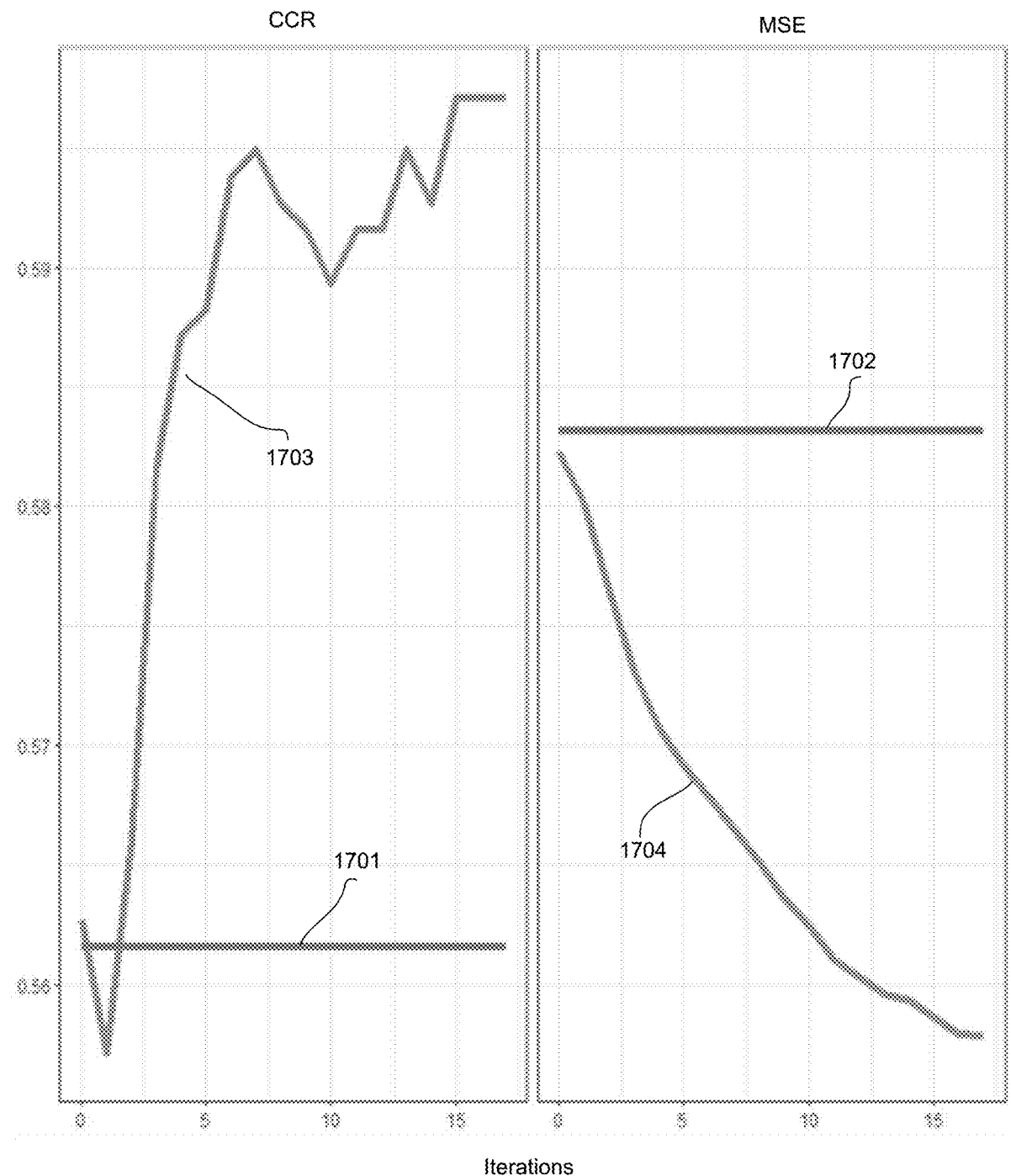
FIG. 17 illustrates a comparison in prediction accuracy over iterations between CCR and MSE in accordance to embodiments of the invention.

FIG. 17 illustrates a comparison in prediction accuracy over iterations between CCR and MSE in accordance to embodiments of the invention. In FIG. 11, lines 1701 and 1702 are for 2 clusters, and lines 1703 and 1704 are for a single cluster. As shown, the prediction performance is improved over iterations for the 2 clusters using embodiments of the invention. Specifically, while the value of CCR is getting increased, the value of MSE is getting decreased over iterations. It is also observed that the result of single cluster (i.e., known solutions) is worse than with the 2 clusters.

Figure 18:
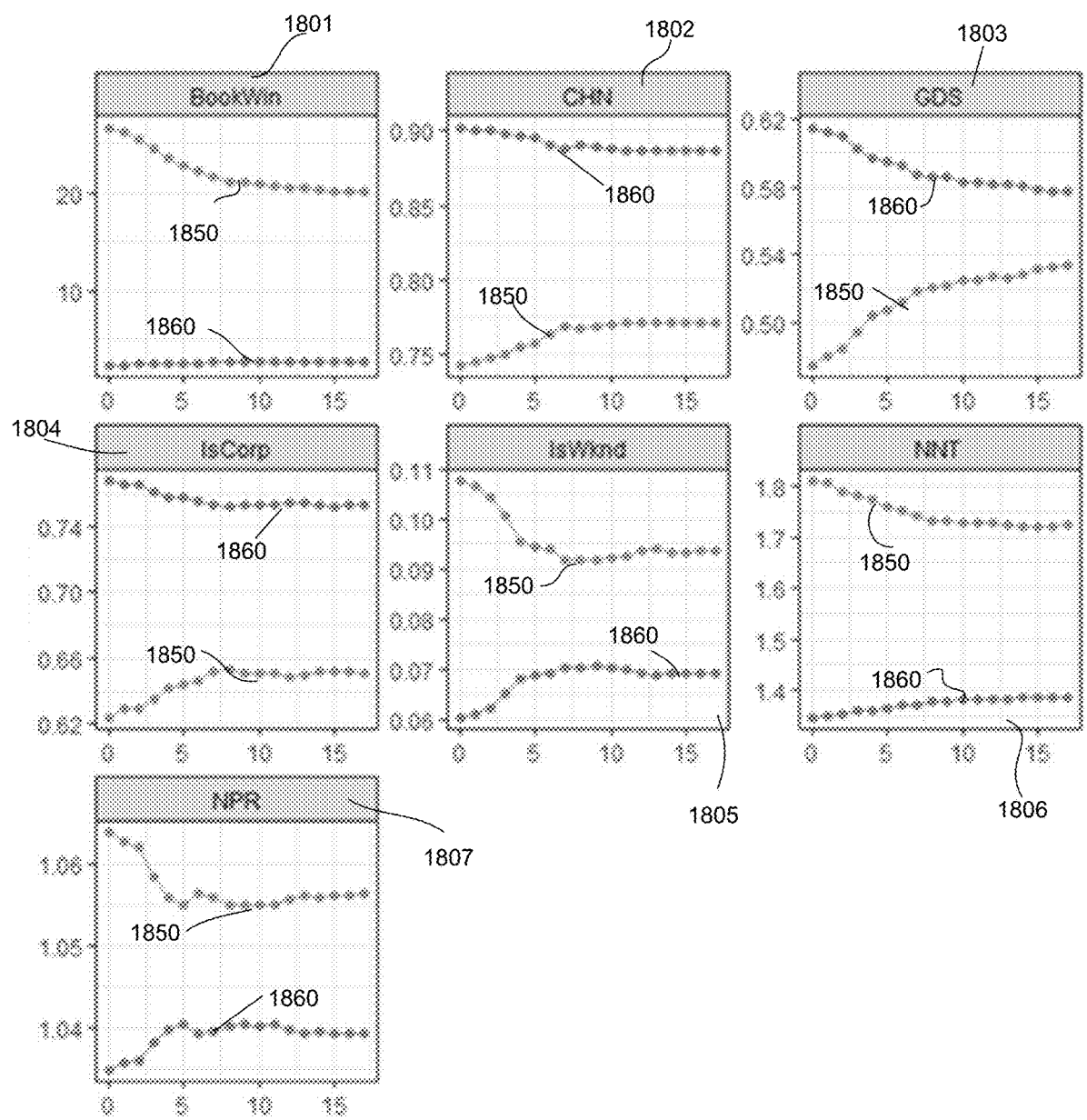
FIG. 18 illustrates how the cluster characteristics are changed over iterations given two clusters in accordance to embodiments.

FIG. 18 illustrates how the cluster characteristics are changed over iterations given two clusters in accordance to embodiments. Specifically, FIG. 18 illustrates how the centroid values are moved over iterations, where curves 1850 are for the CCR and curves 1860 are for the MSE. Seven attributes are used to cluster customers to address the heterogeneous customer population: global distribution system (1803), booking channel (1802), number of nights (1806), number of arriving customers (1807), booking advanced days (1801), whether customers arrived in weekend (1805), and whether customers book through corporate code (1804). FIG. 18 shows how each attribute is moved for each cluster over iterations.

As disclosed, embodiments incorporate a novel approach to predicting the customer choice and estimating the relative values of the room categories and service type features in the hotel industry based on the booking customers' attributes, orders of the room-service pairs in the offer, and offered price. Specifically, most of the demand-forecasting tools currently used by the hotel industry are aimed at providing the overall number of bookings based on a time series analysis assuming a single cluster (i.e., homogeneous customer population), thus ignoring heterogeneous customer populations. These demand modeling tools are often ineffective in the presence of heterogeneous customers with significantly different willingness-to-pay and patterns of behavior. Even if a few tools consider heterogeneous customer population, they employ a standard cluster algorithm which may not reflect the customer choice behaviors during the clustering process. Moreover, in general, no demand forecasting tools address the order of the room category-rate code pairs. The order of display on the website affects the customer's choice behavior in addition to the offered price.

Embodiments enable high-accuracy prediction of the room-service combination by a booking customer. Through the computational experiments, embodiments show that the prediction rate using a dynamic clustering approach achieves around 4% higher than the static clustering approach. Further, embodiments input the information on the order of the room category and rate code for the display optimization system, which can help hoteliers formulate more suitable marketing strategies and propose personalized recommendations that tend more to be accepted.

In addition, embodiments can incorporate any unsupervised machine learning techniques for clustering, such as random forest, or soft clustering algorithms using Gaussian mixture models, into the first step of the algorithm. Unlike the choice of customers, the cluster membership is unobservable, thus, it is more challenging to assume a pre-specified parametric model about how clusters are formed based on the customer characteristics, and hard to test if the pre-specified parametric model is correct or not. Failure to specify a correct model leads to biased parameter estimates or low goodness-of-fit measures which affects prediction accuracy. Since embodiments do not require any pre-specified parametric model form for clustering structure, possible biases from model miss-specification can be avoided.

Embodiments implement dynamic clustering as a form of machine learning, particularly when it involves training as with embodiments of the invention. Embodiments use unsupervised learning, which takes a set of data that contains only inputs, and find structure in the data, such as grouping or clustering of data points. Cluster analysis is the assignment of a set of observations into subsets, referred to as clusters, so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. Dynamic clustering as a form of unsupervised online/incremental machine learning considers two concepts: (1) incrementality of the learning methods to devise the clustering model and (2) self-adaptation of the learned model (parameters and structure).

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of generating a demand model for a potential hotel customer of a hotel room, the method comprising:
based on features of the potential hotel customer, forming a plurality of clusters using a cluster model, each cluster comprising a corresponding weight and cluster probabilities, each cluster corresponding to a different hotel customer persona;
generating an initial estimated mixture of multinomial logit (MNL) models, each comprising a choice model and corresponding to each of the plurality of clusters, each MNL model based on parameters related to hotel room offerings and configured to predict a choice probability of room categories and rate code combinations for the potential hotel customer, the mixture of MNL models comprising a weighted likelihood function based on the features and the weights;
forming an Expectation Maximation functionality comprising a weighted likelihood function comprising a combination of the cluster model and the choice model, the weighted likelihood function comprising an objective function comprising a plurality of model parameters;
estimating the model parameters by finding a maximizer of the Expectation Maximation functionality comprising a plurality of iterations, the estimating comprising dynamically updating the cluster probabilities at each iteration evaluated at a value of the model parameters at a previous iteration and estimating an updated mixture of MNL models based on the updated cluster probabilities at each iteration; and
based on the value of the model parameters, generating the demand model.

2. The method of claim 1, wherein the features of the potential hotel customer are known at a time of a request for a hotel room and before a choice of the hotel room.

3. The method of claim 1, the generating the estimated mixture of MNL models is based on offered prices, room category and rate plan position in the offer, and room and rate features.

4. The method of claim 1, wherein the forming the cluster model comprises unsupervised machine learning.

5. The method of claim 4, wherein the unsupervised machine learning comprises one of dynamic clustering or soft clustering using Gaussian mixture models.

6. The method of claim 1, wherein the estimating and iterations are repeated until a convergence criteria is reached, and the demand model is generated after the convergence criteria is reached.

7. The method of claim 1, wherein the features comprise at least one of: an arrival date and time, a number in a party, a booking channel or a booking window.

8. The method of claim 1, wherein the demand model is adapted to maximize revenue for the hotel room.

9. A non-transitory computer readable medium having instructions stored thereon that, when executed by one or more processors, cause the processors to generate a demand model for a potential hotel customer of a hotel room, the generating the demand model comprising:
based on features of the potential hotel customer, forming a plurality of clusters using a cluster model, each cluster comprising a corresponding weight and cluster probabilities, each cluster corresponding to a different hotel customer persona;
generating an initial estimated mixture of multinomial logit (MNL) models, each comprising a choice model and corresponding to each of the plurality of clusters, each MNL model based on parameters related to hotel room offerings and configured to predict a choice probability of room categories and rate code combinations for the potential hotel customer, the mixture of MNL models comprising a weighted likelihood function based on the features and the weights;
forming an Expectation Maximation functionality comprising a weighted likelihood function comprising a combination of the cluster model and the choice model, the weighted likelihood function comprising an objective function comprising a plurality of model parameters;
estimating the model parameters by finding a maximizer of the Expectation Maximation functionality comprising a plurality of iterations, the estimating comprising dynamically updating the cluster probabilities at each iteration evaluated at a value of the model parameters at a previous iteration and estimating an updated mixture of MNL models based on the updated cluster probabilities at each iteration; and
based on the value of the model parameters, generating the demand model.

10. The computer readable medium of claim 9, wherein the features of the potential hotel customer are known at a time of a request for a hotel room and before a choice of the hotel room.

11. The computer readable medium of claim 9, the generating the estimated mixture of MNL models is based on offered prices, room category and rate plan position in the offer, and room and rate features.

12. The computer readable medium of claim 9, wherein the forming the cluster model comprises unsupervised machine learning.

13. The computer readable medium of claim 12, wherein the unsupervised machine learning comprises one of dynamic clustering or soft clustering using Gaussian mixture models.

14. The computer readable medium of claim 9, wherein the estimating and iterations are repeated until a convergence criteria is reached, and the demand model is generated after the convergence criteria is reached.

15. The computer readable medium of claim 9, wherein the features comprise at least one of: an arrival date and time, a number in a party, a booking channel or a booking window.

16. The computer readable medium of claim 9, wherein the demand model is adapted to maximize revenue for the hotel room.

17. A hotel reservation system that generates a demand model for a potential hotel customer of a hotel room comprising:
one or more processors coupled to stored instructions; and
a database storing historical booking data;
the processors configured to:
based on features of the potential hotel customer, forming a plurality of clusters using a cluster model, each cluster comprising a corresponding weight and cluster probabilities, each cluster corresponding to a different hotel customer persona;
generating an initial estimated mixture of multinomial logit (MNL) models, each comprising a choice model and corresponding to each of the plurality of clusters, each MNL model based on parameters related to hotel room offerings and configured to predict a choice probability of room categories and rate code combinations for the potential hotel customer, the mixture of MNL models comprising a weighted likelihood function based on the features and the weights;

forming an Expectation Maximation functionality comprising a weighted likelihood function comprising a combination of the cluster model and the choice model, the weighted likelihood function comprising an objective function comprising a plurality of model parameters;

estimating the model parameters by finding a maximizer of the Expectation Maximation functionality comprising a plurality of iterations, the estimating comprising dynamically updating the cluster probabilities at each iteration evaluated at a value of the model parameters at a previous iteration and estimating an updated mixture of MNL models based on the updated cluster probabilities at each iteration; and based on the value of the model parameters, generating the demand model.

18. The hotel reservation system of claim 17, wherein the features of the potential hotel customer are known at a time of a request for a hotel room and before a choice of the hotel room.

19. The hotel reservation system of claim 17, the generating the estimated MNL models is based on offered prices, room category and rate plan position in the offer, and room and rate features.

20. The hotel reservation system of claim 17, wherein the forming the Cluster model comprises unsupervised machine learning.

* * * * *

UNITED STATES PATENT AND TRADEMARK OFFICE
CERTIFICATE OF CORRECTION

PATENT NO. : 12,014,310 B2
APPLICATION NO. : 17/399342
DATED : June 18, 2024
INVENTOR(S) : Cho et al.

It is certified that error appears in the above-identified patent and that said Letters Patent is hereby corrected as shown below:

In the Specification

In Column 6, Line 57, delete "indicator $\ell_i$" and insert -- indicator $\ell_i$ --, therefor.

In Column 6, Line 60, delete "for $\ell_i$," and insert -- for $\ell_i$, --, therefor.

In Column 6, Lines 63-64, delete "$P\ell_i = g|x_i) = f_g(\vec{x}_i)$" and insert -- $P(\ell_i = g \mid x_i) = f_g(\vec{x}_i)$ --, therefor.

In Column 7, Line 1, delete "model $\ell_i$" and insert -- model $\ell_i$ --, therefor.

In Column 7, Line 15, delete "indicator $\ell_i$" and insert -- indicator $\ell_i$ --, therefor.

In Column 7, Line 41, delete "$P\ell_i = g \mid \vec{x}_i)$," and insert -- $P(\ell_i = g \mid \vec{x}_i)$ --, therefor.

In Column 7, Line 47, delete "indicator $\ell_i$" and insert -- indicator $\ell_i$ --, therefor.

In Column 8, Line 13, delete "of $\ell_i$" and insert -- of $\ell_i$ --, therefor.

In Column 8, Lines 19-20, delete "$\pi_{ig}^{(t)} = E\ell_i = g|y,x,z;\vec{\theta}^{(t)}) = P\ell_i = g|y,x,z;\vec{\theta}^{(t)})$,"

Signed and Sealed this
Twenty-ninth Day of October, 2024

*Katherine Kelly Vidal*

Katherine Kelly Vidal
*Director of the United States Patent and Trademark Office*

CERTIFICATE OF CORRECTION (continued)
U.S. Pat. No. 12,014,310 B2 and insert -- $\pi_{ig}^{(t)} = E\left(\ell_i = g \mid y, x, z; \vec{\theta}^{(t)}\right) = P(\ell_i = g \mid y, x, z; \vec{\theta}^{(t)})$ --, therefor.

In Column 8, Line 46, delete "$P(\ell_i = g \mid \vec{x}_i).$" and insert -- $P(\ell_i = g \mid \vec{x}_i).$ --, therefor.

In the Claims

In Column 16, Line 62, in Claim 17, delete "models." and insert -- models, --, therefor.

In Column 17, Line 30, in Claim 20, delete "Cluster" and insert -- cluster --, therefor.